United States Patent [19]

Takahashi et al.

[11] Patent Number: 5,841,939
[45] Date of Patent: Nov. 24, 1998

[54] PICTURE REPRODUCTION APPARATUS AND PICTURE DECODING APPARATUS

[75] Inventors: Toshiya Takahashi, Takatsuki; Tatsushi Bannai, Sakai, both of Japan

[73] Assignee: Matsushita Electric Industrial Co., Ltd., Osaka, Japan

[21] Appl. No.: 807,640

[22] Filed: Feb. 27, 1997

Related U.S. Application Data

[62] Division of Ser. No. 254,037, Jun. 3, 1994, Pat. No. 5,649,047.

[30] Foreign Application Priority Data

Jun. 3, 1993 [JP] Japan ..................................... 5-133132
Dec. 13, 1993 [JP] Japan ..................................... 5-342391

[51] Int. Cl.$^6$ ............................. H04N 5/783; H04N 5/92
[52] U.S. Cl. .................................................. 386/68; 386/111
[58] Field of Search ........................ 386/68, 111; 348/423; H04N 5/783, 5/92

[56] References Cited

U.S. PATENT DOCUMENTS

| 4,992,887 | 2/1991 | Aragaki | 358/403 |
|---|---|---|---|
| 5,023,710 | 6/1991 | Kondo et al. | 348/421 |
| 5,140,437 | 8/1992 | Yonemitsu | 386/111 |
| 5,231,517 | 7/1993 | Taguchi | 358/453 |
| 5,274,453 | 12/1993 | Maeda | 348/409 |
| 5,408,474 | 4/1995 | Wakamori | 386/98 |
| 5,450,209 | 9/1995 | Niimura et al. | 386/111 |
| 5,488,418 | 1/1996 | Mishima | 348/423 |

FOREIGN PATENT DOCUMENTS

| 0396285 | 11/1990 | European Pat. Off. . |
|---|---|---|
| 0517141 | 12/1992 | European Pat. Off. . |
| 2-244873 | 9/1990 | Japan . |
| 4-332283 | 11/1992 | Japan . |
| 5-167981 | 7/1993 | Japan . |

OTHER PUBLICATIONS

E. Takakura et al., "Study on Image Quality Reproduced at Variable Speeds by Digital VCR", *Extended Abstracts; The Annual Meeting of the Institute of Television Engineers*, pp. 93–94 (1992) (partial English translation provided).

"Information Technology—Coding of moving pictures and associated audio for digital storage media up to about 1.5 Mbit/s", *Draft International Standard ISO/IEC/DIS 11172*, p. 61, (1992).

C. Herpel et al., "Adaption and Improvement of CCITT Reference Model 8 Video Coding for Digital Storage Media Applications", *Signal Processing Image Communication*, vol. 2, No. 2, pp. 171–185 (Aug. 1990).

European Search Report dated Feb. 21, 1995.

*Primary Examiner*—Howard Britton
*Attorney, Agent, or Firm*—Ratner & Prestia

[57] ABSTRACT

The picture reproduction apparatus of this invention reproduces compressed image data which has been compressed using inter-frame encoding, extracts a header from the reproduced image data, taking out intra-frame encoded image data using the information of the header. Invalid data is added to the image data other than the intra-frame encoded data. The image data is output into a picture decoding apparatus, so as to obtain a reproduced video image during playback in fast forward and fast reverse. Alternatively, valid image data is detected from the reproduced image data. In the slow playback at a 1/N speed, M (<N) frames of valid image data and (N−1)*M frames of invalid image data are output in order to obtain a slow image output.

12 Claims, 18 Drawing Sheets

FIG. 2

| Header pattern | Inter-frame encoded block | Header pattern | Intra-frame encoded block | Header pattern |
|---|---|---|---|---|

FIG. 3

| Header pattern | Inter-frame encoded block | Intra-frame encoded block | Header pattern |
|---|---|---|---|

FIG.5

| 0,0,0....... | Header pattern | Intra-frame encoded block | 0,0,0....... |

FIG.6

| X,X,X....... | Header pattern | Intra-frame encoded block | X,X,X....... |

PRIOR ART

PICTURE REPRODUCTION APPARATUS AND PICTURE DECODING APPARATUS

This application is a division of application Ser. No. 08/254,037, filed Jun. 3, 1994, now U.S. Pat. No. 5,649,047.

BACKGROUND OF THE INVENTION

1. Field of the Invention

The present invention relates to a picture reproduction apparatus and a picture decoding apparatus used for reproducing a digital compressed video image recorded on a recording medium.

2. Description of the Related Art

An apparatus for recording/reproducing a compressed digital video image has been developed with the progress of picture compression techniques. FIG. 18 is a block diagram of a conventional picture recording/reproducing apparatus. The conventional picture recording/reproducing apparatus shown in FIG. 18 includes a picture encoding section 91 using an intra-frame discrete cosine transform (DCT) encoder, a recording section 92, a recording medium 93, a reproducing section 94, and a picture decoding section 95 using an intra-frame DCT decoder. A digital video image taken by a camera or the like is input into the intra-frame DCT encoder 91. In the intra-frame DCT encoder 91, the digital video image is encoded by data processing such as DCT and variable length encoding, frame by frame. Then, the processed video signal is rearranged into a recording format, and an error correction code is added thereto in the recording section 92. Thereafter, the reformatted digital video signal with the error correction code is recorded onto the recording medium 93. During the playback, any error in the reproduced signal is corrected, and the reproduced signal is reformatted into a decoding format in the reproducing section 94. Thereafter, the reproduced signal is decoded by a data process such as variable length decoding and inverse DCT in the picture decoding section 95, so as to obtain a reproduced video image. As to the intra-frame encoding, a usual encoding is completed in a data unit of one frame or one block consisting of (8×8) pixels or the like. Accordingly, during playback in fast forward or fast reverse in which only a part of data can be reproduced, the resulting video image has a certain quality with which the contents of the image can be perceived (see, for example, "Study on Image Quality Reproduced at Variable Speeds by Digital VCR", by Takakura et al., Extended Abstracts; The Annual Meeting of The Institute of Television Engineers, 1992, pp. 93–94).

FIG. 19 is a block diagram of a conventional picture decoding apparatus using motion-compensation and inter-frame encoding techniques. In FIG. 19, a picture decoding section 4 includes a buffer 41, a variable length decoder 42, an inverse quantization circuit 43, an inverse DCT circuit 44, and a motion compensating circuit 45. Also, a frame memory 5 is provided. First, compressed image data is input into the buffer 41. Then, the data is decoded by processing of variable length decoding, inverse quantization, and inverse DCT, so as to obtain real-time data. In this scheme, the inter-frame decoding technique is used, so that the difference between successive frames is encoded. Accordingly, when the image data is to be recovered, the decoded difference data is added to a block obtained by motion-compensating the data of previous frames stored in the frame memory 5 by each block, so as to obtain the decoded image data.

According to the inter-frame encoding by which the difference is sent, a motion component is effectively transmitted by motion compensation. Thus, the inter-frame encoding system can attain high data compression rates while suppressing deterioration of image quality, as compared with the intra-frame encoding system shown in FIG. 18 (see, for example, ISO/IEC/DIS 11172 "Information Technology—Coding of moving pictures and associated audio for digital storage media up to about 1.5 Mbps", 1992, p. 61).

Since the system shown in FIG. 18 uses the intra-frame encoder, there is a disadvantage in that the data compressibility can not be set as high as that in the inter-frame encoding system or the like. This disadvantage can be overcome by using an inter-frame encoding technique in the picture encoding section and decoding section as in the system shown in FIG. 19. However, the difference data is encoded, so that the current frame can be reproduced only after the image of previous frame is reproduced. Thus, the system shown in FIG. 19 also has a disadvantage in that the desired image cannot be obtained during playback in fast forward or fast reverse in which only a part of the image data can be reproduced.

In slow playback at a half speed or the like, as shown in FIG. 20, the output from the reproducing section includes mixed reproduced image data and other invalid data (cross talk, noise etc.) in a doubled period as compared with normal playback. The kind of invalid data is not assured, so that a synchronization pattern or the like may possibly be output. Therefore, if the reproduced output is directly sent to the decoding apparatus, malfunctions of the decoding apparatus such as turbulence in the reproduced image occurs due to the invalid data portion.

SUMMARY OF THE INVENTION

The picture reproduction apparatus of this invention includes: reproducing means for reproducing compressed image data from a recording medium, the compressed image data including an intra-frame encoded data and a header having information for the intra-frame encoded data; header extracting means for detecting and extracting the header from the reproduced image data; intra-frame encoded data extracting means for extracting the intra-frame encoded data from the reproduced image data by using the information of the extracted header; and invalid data adding means for adding invalid data to the extracted intra-frame encoded data, thereby producing a trick-play compressed image data, and for outputting the trick-play compressed image data into a picture decoding apparatus during a trick-play mode.

In one embodiment of the invention, the picture reproduction apparatus may further include recording means for receiving the compressed image data and for recording it onto the recording medium.

In another embodiment of the invention, the picture reproduction apparatus may further include switch means for, during a normal playback, outputting the compressed data reproduced from the recording medium into the picture decoding apparatus, and for, only when a trick-play mode signal for requesting trick-play is input into the switch means, outputting the trick-play compressed image data into the picture decoding apparatus.

In another embodiment of the invention, only when a trick-play mode signal is input, a trick-play mode signal is output into the picture decoding apparatus together with the trick-play image data.

In another embodiment of the invention, the invalid data includes a header of remaining part of the compressed image data which cannot be reproduced.

According to another aspect of the invention, a picture decoding apparatus is provided. The picture decoding apparatus includes: picture decoding means for decoding compressed image data; a frame memory for storing the decoded image data; and trick-play control means for, when a decoding disable signal is input for a predetermined or longer period, performing a control so that an intra-frame encoded portion is extracted from the compressed image data and only the intra-frame encoded portion is written into the frame memory, and the contents for the remaining portion other than the intra-frame encoded portion are not updated.

Alternatively, the picture decoding apparatus may alternatively includes trick-play control means for, when a trick-play mode signal is input, performing a control so that only an intra-frame encoded portion is extracted from the decoded image data and written into the frame memory, and the contents for the remaining portion other than the intra-frame encoded portion are not updated.

According to another aspect of the invention, a picture reproduction apparatus is provided for reproducing compressed image data from a recording medium, and for outputting the image data reproduced from the recording medium into a picture decoding apparatus, frame by frame, in accordance with either one of a normal playback mode or a slow playback mode. The picture reproduction apparatus includes: reproducing means for reproducing the compressed image data from the recording medium, and for outputting the reproduced image data including valid image data and invalid image data; valid image data detecting means for detecting the valid image data from the reproduced image data capable of being recovered of the image data or invalid image data having no relationship with the image data, and for generating a valid data detection signal identifying the valid image data; invalid data producing means for, when the invalid image data is input, producing invalid data for a period in which the invalid image data is input; and trick-play control means for, in the normal playback mode, outputting the image data obtained from the reproducing means, and for, in the slow playback mode and when the valid data detection signal is input from the valid data detecting means, dividing the valid image data into variable-length encoded unit data, the unit being the minimum unit capable of being variable-length encoded, so as to alternately output the variable-length encoded unit data of one unit or more and the invalid data.

According to another aspect of the invention, the picture reproduction apparatus may alternatively include trick-play control means for, in the normal playback mode, outputting the image data obtained from the reproducing means, and for, in the slow playback mode at a 1/N speed (N is a natural number) outputting one frame of the valid image data and (N−1) frames of the invalid data in a period equivalent to N frames in the normal playback.

According to another aspect of the invention, the picture reproduction apparatus may alternatively include trick-play control means for, in the normal playback mode, outputting the image data obtained from the reproducing means, and for, in the slow playback mode at a 1/N speed (N is a natural number) storing M (M is a natural number) frames of the valid image data obtained by the valid image data detecting means, so as to periodically output M frames of the valid image data and (N−1)×M frames of the invalid data.

According to another aspect of the invention, the picture reproduction apparatus may alternatively include trick-play control means for, in the normal playback mode, outputting the image data obtained from the reproducing means, and for, in the slow playback mode at a 1/N speed (N is a natural number) storing the valid image data obtained by the valid data detecting means, and dividing the stored valid image data into M frames, so as to repeatedly output each of the M frames N times.

In one embodiment of the invention, the picture reproduction apparatus may further include recording means for receiving the compressed image data and for recording it onto the recording medium.

In another embodiment of the invention, the trick-play control means outputs the valid image data and the invalid data, and also outputs a trick-play mode signal including a slow playback ratio N, into the picture decoding apparatus in the trick-play mode.

According to another aspect of the invention, a picture decoding apparatus is provided for decoding compressed image data output from a picture reproduction apparatus and reproducing valid image data in either of a normal playback mode or a slow playback mode. The picture decoding apparatus includes: picture decoding means for decoding the compressed image data output from the picture reproduction apparatus; a frame memory for storing the image data decoded by the picture decoding means; and trick-play control means for performing a control so that a frame number is extracted from the reproduced image data, and, when the extracted frame number is the same as that of the image data which is input immediately before, the image data which is the same as the previous image data is again written into the frame memory.

According to another aspect of the invention, the picture decoding apparatus may alternatively include trick-play control means for performing a control so that a frame number is extracted from the reproduced image data, and whether the extracted frame number is the same as that of the image data which is input immediately before or not is determined, and performs a control so that, for the frame number of the image data which has been already decoded, the input image data is not written into the frame memory.

According to another aspect of the invention, the picture decoding apparatus may alternatively include trick-play control means for performing a control so that, when a time required for decoding one frame of compressed image data is equal to (N−1) frames or more or equal to N frames or less (N is a natural number), the contents of the frame memory are retained for a period of N frames or more.

According to another aspect of the invention, the picture decoding apparatus may alternatively include trick-play control means for performing a control so that, when a slow playback mode at a 1/N speed (N is a natural number) is input, the contents of the frame memory are retained for a period of N frames or more.

According to the above construction, even when the compressed image data is encoded by inter-frame encoding, only the intra-frame encoded block is extracted and sent to the decoding apparatus in which the update is performed for the intra-frame encoded block. Thus, it is possible to obtain a reproduced picture during the trick play in fast forward or fast reverse. In addition, since the intra-frame encoded block is extracted by detecting only the header of the compressed data, it is unnecessary to decode all of the compressed image data during the playback. Accordingly, even in the case where the inter-frame compressed data is recorded on a recording/reproducing apparatus or the like which utilizes the intra-frame encoding technique, the above function can be realized by adding a simple circuit.

Furthermore, the output of N frames from the picture reproduction apparatus is composed of valid data of one frame and invalid data of (N−1) frames, or the image data of one frame is held for N frames in the picture decoding apparatus, so that the desired reproduced picture can be obtained during slow playback at 1/N speed even in the cases where the compression is performed by inter-frame encoding.

Thus, the invention described herein makes possible the advantage of providing a picture reproduction apparatus and a picture decoding apparatus for allowing a picture to be reproduced during trick play such as fast forward, fast reverse, or slow, even when the inter-frame coding is used.

This and other advantages of the present invention will become apparent to those skilled in the art upon reading and understanding the following detailed description with reference to the accompanying figures.

BRIEF DESCRIPTION OF THE DRAWINGS

FIG. 2 illustrates a format of compressed image data according to the invention.

FIG. 3 illustrates a format of compressed image data according to the invention.

FIG. 5 illustrates a format of compressed image data for trick play in the first example according to the invention.

FIG. 6 illustrates a format of compressed image data for trick play in the first example according to the invention.

DESCRIPTION OF THE PREFERRED EMBODIMENTS

The present invention will be described hereinafter by way of illustrative examples with reference to the accompanying drawings.

EXAMPLE 1

Figure 1:
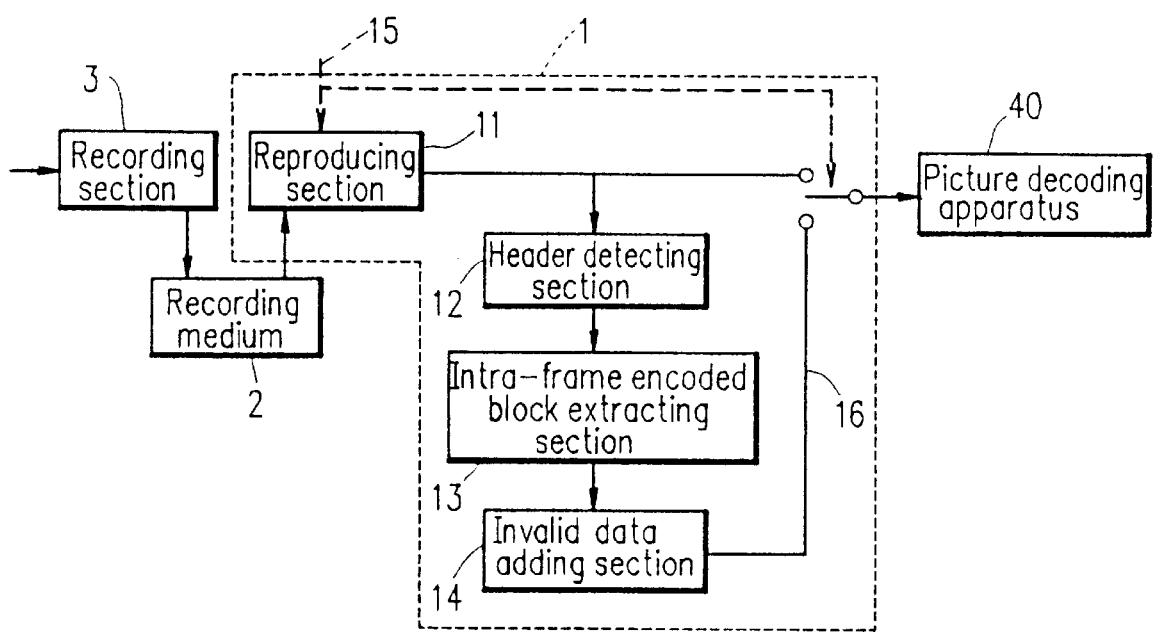
FIG. 1 is a block diagram of a picture reproduction apparatus in a first example according to the invention.
Figure 4:
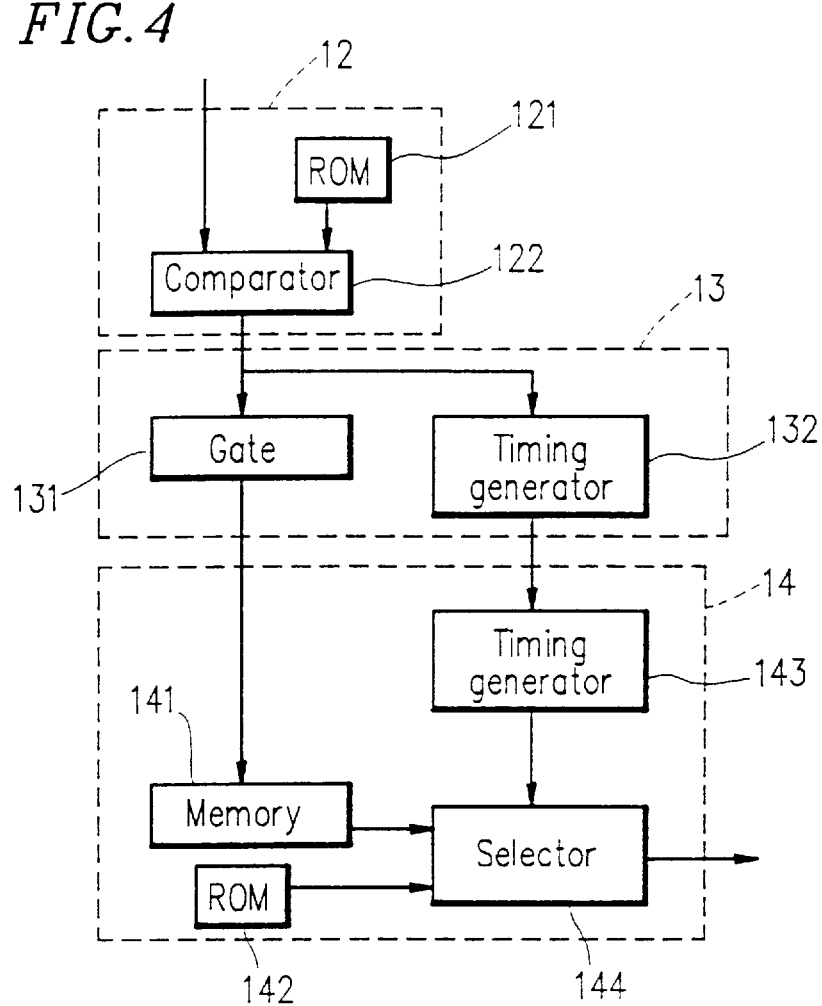
FIG. 4 is a detailed block diagram of the picture reproduction apparatus in the first example according to the invention.

FIG. 1 is a block diagram of a picture reproduction apparatus in a first example according to the invention. In FIG. 1, the picture reproduction apparatus 1 includes a reproducing section 11, a header detecting section 12, an intra-frame encoded block extracting section 13, and an invalid data adding section 14. Also, a recording medium 2, a recording section 3, and a picture decoding apparatus 40 are provided. FIGS. 2 and 3 are explanatory diagrams illustrating formats of the compressed data. FIG. 4 schematically shows the detailed construction of the header detecting section 12, the intra-frame encoded block extracting section 13, and the invalid data adding section 14. FIGS. 5 and 6 illustrate exemplary formats of trick-play compressed image data 16.

The picture reproduction apparatus having the above construction is described referring to FIGS. 1, 2, 3, 4, 5, and 6.

Figure 18:
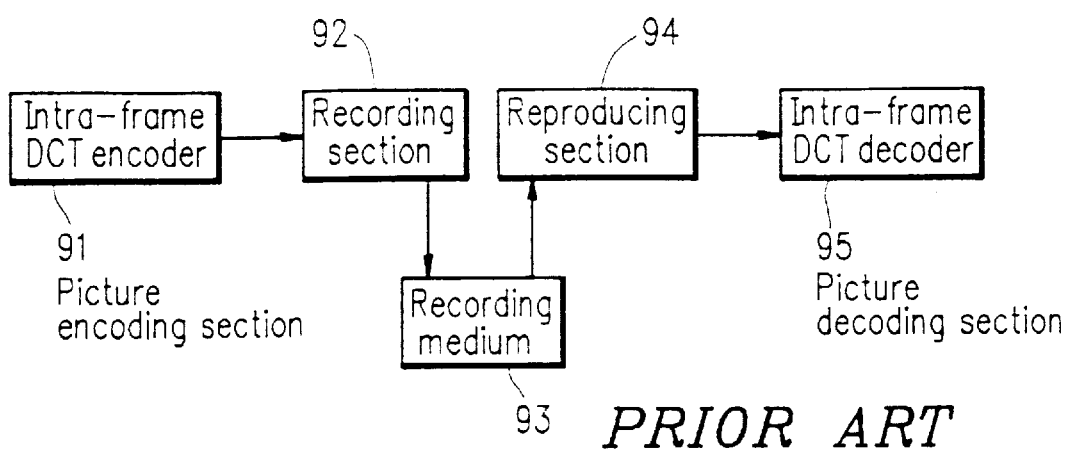
FIG. 18 is a block diagram of a conventional picture recording/reproducing apparatus.
Figure 19:
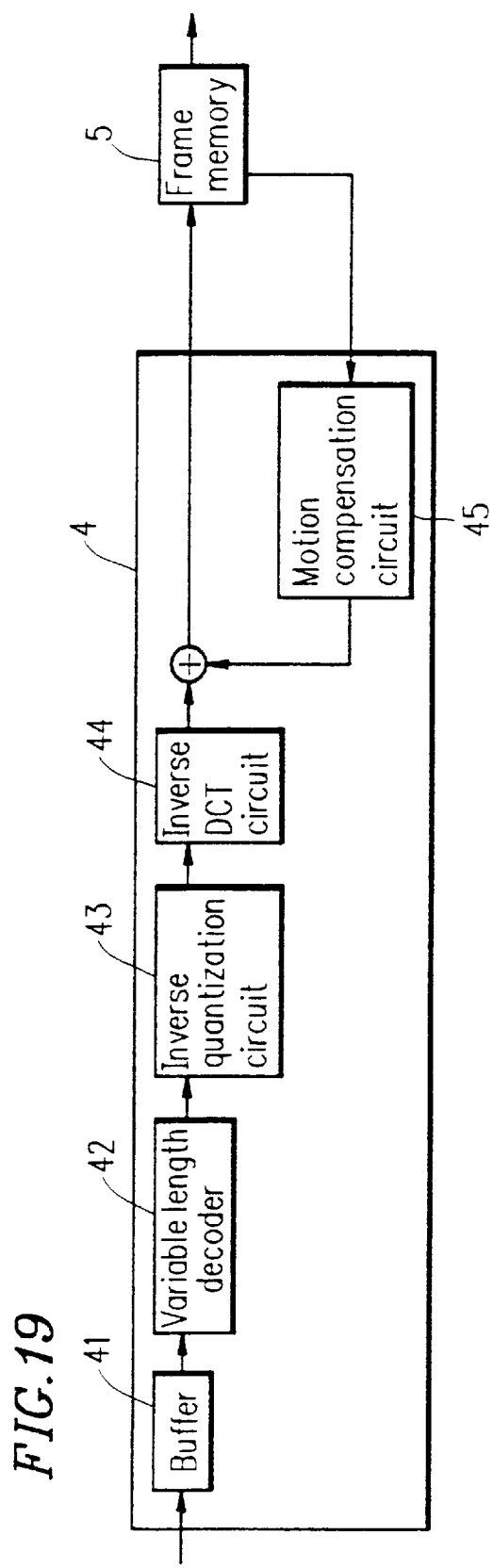
FIG. 19 is a block diagram of a conventional picture decoding apparatus.
Figure 20:
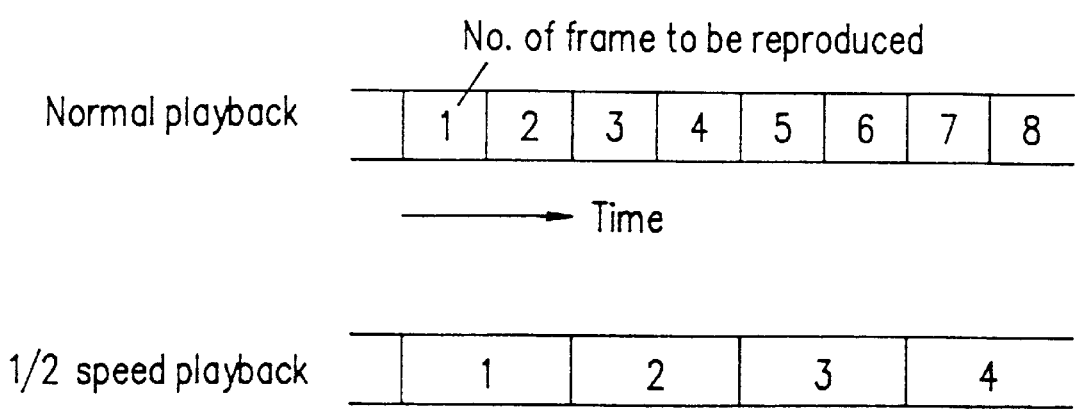
FIG. 20 illustrates outputs from a conventional picture reproduction apparatus.

In FIG. 1, the input image data is assumed to be compressed by inter-frame encoding. The compressed image data is reformatted into a recording format and an error correction code is added thereto in the recording section 3, similar to the recording section 92 in the conventional example as shown in FIG. 18. Then, the reformatted image data with the error correction code is recorded onto the recording medium 2. During normal playback, any error in the reproduced signal is corrected, and the reproduced signal is reformatted into a decoding format in the reproducing section 11. Thereafter, the reproduced image data is sent out to the picture decoding apparatus 40.

FIGS. 2 and 3 illustrate exemplary data formats of compressed image data. In the inter-frame compression encoding method which is currently generally used, one frame is split into blocks each having about 16×16 pixels. Next, either of the inter-frame encoding in which the difference between frames is encoded, or the intra-frame encoding in which the original data itself is encoded is selected by calculation, whichever will result in a smaller amount of information to be sent. Accordingly, the compressed data of one frame includes mixed inter-frame and intra-frame encoded data. As described above, in the trick play such as fast forward or fast reverse, only a part of the recorded data can be reproduced because a tape head cannot scan the whole tracks on a recording medium. Herein, data which is partially reproduced, that is to say, data which cannot be variable-length decoded, is referred to as "invalid image data." Invalid image data is generated when a header or a terminating code of a data block is not read. If the reproduced part of the recorded data is the difference data, data to be added is required. However, there is no assurance that the data to be added is also reproduced.

In FIG. 2, intra-frame encoded blocks are collected immediately after a specific header pattern. In this case, it is assumed that the header pattern includes a flag indicating that the succeeding data includes inter-frame encoded blocks or that the succeeding data consists of only intra-frame encoded blocks. In FIG. 3, the data after a header pattern includes mixed inter-frame encoded blocks and intra-frame encoded blocks. In this case, it is assumed that the positions of the intra-frame encoded blocks are identified in the header pattern, for example, using the number of bits measured from the header pattern, so that the positions are determined without decoding.

Now, consider the case where image data having the formats shown in FIGS. 2 and 3 are recorded, and a trick-play mode signal 15 requiring the trick play is input.

The reproduced image data is first input into the header detecting section 12. In the header detecting section 12, the header pattern is compared with the contents of a read only memory (ROM) 121 by a comparator 122. Thus, the header pattern is checked. Then, only the image data including any intra-frame encoded blocks after the header pattern is sent to the intra-frame encoded block extracting section 13. In the intra-frame encoded block extracting section 13, a signal indicating the position of the intra-frame encoded block is generated from the input data in a timing generator 132. The thus generated signal is fed into a gate 131, so that only the intra-frame encoded blocks are extracted from the image data and sent to the invalid data adding section 14. In the invalid data adding section 14, the intra-frame encoded blocks are stored in a memory 141. In accordance with the timing generated by a timing generator 143, a selector 144 selectively outputs a header pattern stored in a ROM 142, intra-frame encoded data stored in the memory 141, or an invalid data stored in the ROM 142 into the picture decoding apparatus 40, as the trick-play compressed image data 16. Herein, the term "invalid data" means data which is ignored by the decoding apparatus. Invalid data is not decoded by the decoding apparatus and does not cause malfunction when decoding. FIG. 5 shows an example of trick-play compressed image data 16. A header is added immediately before the extracted intra-frame encoded block, and in the remaining time period, the invalid data 0 is continuously output, in order to prevent a pattern identical with the header pattern from being detected. In this example, the data output format is the same as that of the compressed image data. As to the header pattern, it is sufficient to add a header at least for the picture decoding apparatus 40 to decode the image data, such as a header of the intra-frame encoded block to be decoded. It is not necessary to add headers to all of the blocks which are not reproduced.

The picture decoding apparatus 40 receives the resulting output in which the invalid data is inserted into portions corresponding to the inter-frame encoded blocks. Accordingly, the portions cannot be decoded, so that the image data of the previous frame is retained. On the other hand, the reproduced intra-frame encoded blocks can be properly decoded, so that only the intra-frame encoded blocks are updated.

According to the first example with the above-described construction, the picture reproduction apparatus 1 is only required to decode the headers. During the trick play, a part of image is displayed, and hence the contents of the displayed image can be recognized.

In the first example, the invalid data adding section 14 adds the invalid data 0 to the trick-play compressed image data 16. However, the invalid data is not limited to 0. For example, in the case where the header pattern is established so that the picture decoding apparatus 40 can detect the header pattern without failure, indeterminate data "x" as shown in FIG. 6 may be added. In general, the probability that such indeterminate data will be decoded as the normal image data by the picture decoding apparatus 40 is extremely low. Thus, there arises no practical problem, if certain indeterminate data is added.

In the first example, only the intra-frame encoded blocks are extracted by the gate 131. Alternatively, if the reproduced header patterns are additionally and simultaneously extracted, and output into the picture decoding apparatus 40 together with the above-described header pattern, the same effects can be attained.

EXAMPLE 2

Figure 7:
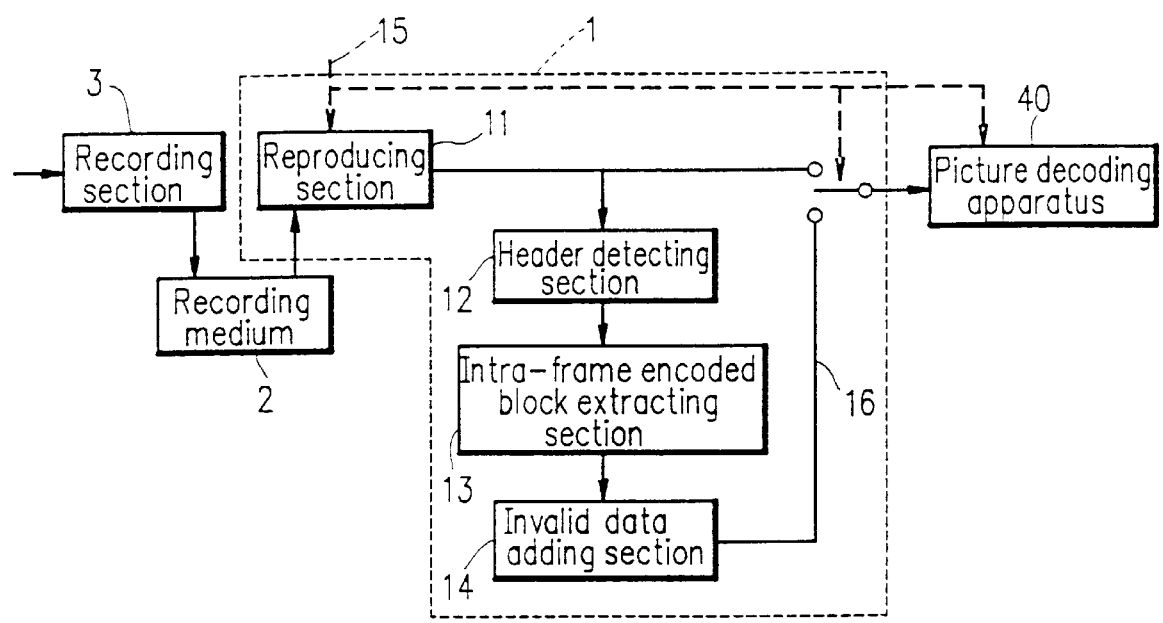
FIG. 7 is a block diagram of a picture reproduction apparatus in a second example according to the invention.

FIG. 7 is a block diagram of a picture reproduction apparatus in a second example according to the invention. The second example is mainly different from the first example in that a trick-play mode signal 15 is sent to the picture decoding apparatus 40 together with the trick-play compressed image data 16 in the second example. In the first example, when invalid data is input during the trick play, the picture decoding apparatus retains the image of the previous frame. However, some decoding apparatus may switch the operation thereof between the process in which the image data of previous frame is retained for the inter-frame encoded frame, and the process in which the image data of intra-frame encoded frame previously sent is substituted for the inter-frame encoded frame, depending on the error occurrence condition. Accordingly, by sending the trick-play mode signal together with the trick-play compressed image data, the processing during the trick play can be surely performed.

The first and second examples are described by way of an apparatus for recording/reproducing image data compressed by both intra-frame encoding and inter-frame encoding. However, the invention is not limited to these specific types of apparatus. Alternatively, such an apparatus can be easily combined with a recording/reproducing apparatus using intra-frame encoding only.

In the first example, the invalid data is added between the respective intra-frame encoded blocks. Alternatively, in the case where intra-frame encoded blocks extracted from several frames of image data are first collected in the memory 141 as shown in FIG. 4, and then the intra-frame encoded blocks are successively output into the picture decoding apparatus 40, the same effects can be attained.

In the second example, the trick-play mode signal is fed in addition to the trick-play compressed image data. Alternatively, the trick-play mode signal may be fed as part of the trick-play compressed image data. For example, the trick-play mode signal may be included in the header of the trick-play compressed image data. However, the invention is not limited to the specific cases described in the first or second example.

EXAMPLE 3

A picture decoding apparatus in a third example according to the invention will be described with reference to relevant figures.

Figure 8:
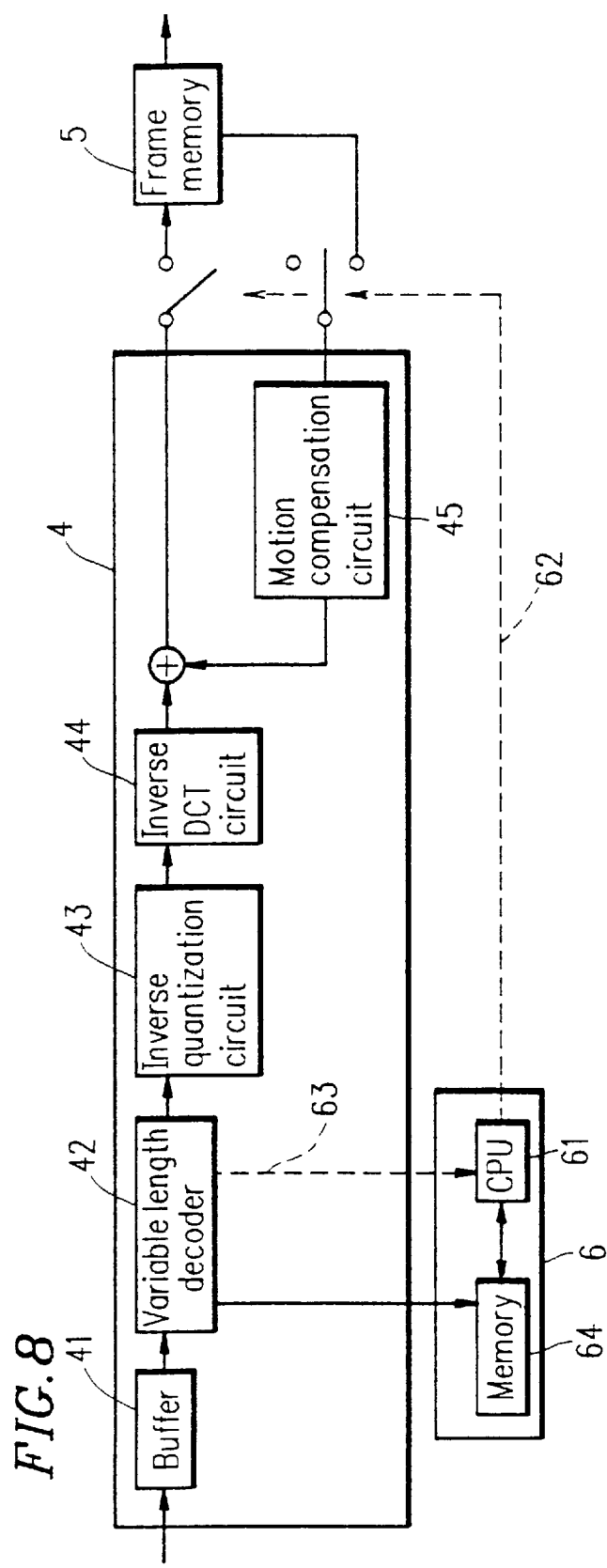
FIG. 8 is a block diagram of a picture decoding apparatus in a third example according to the invention.
Figure 9:
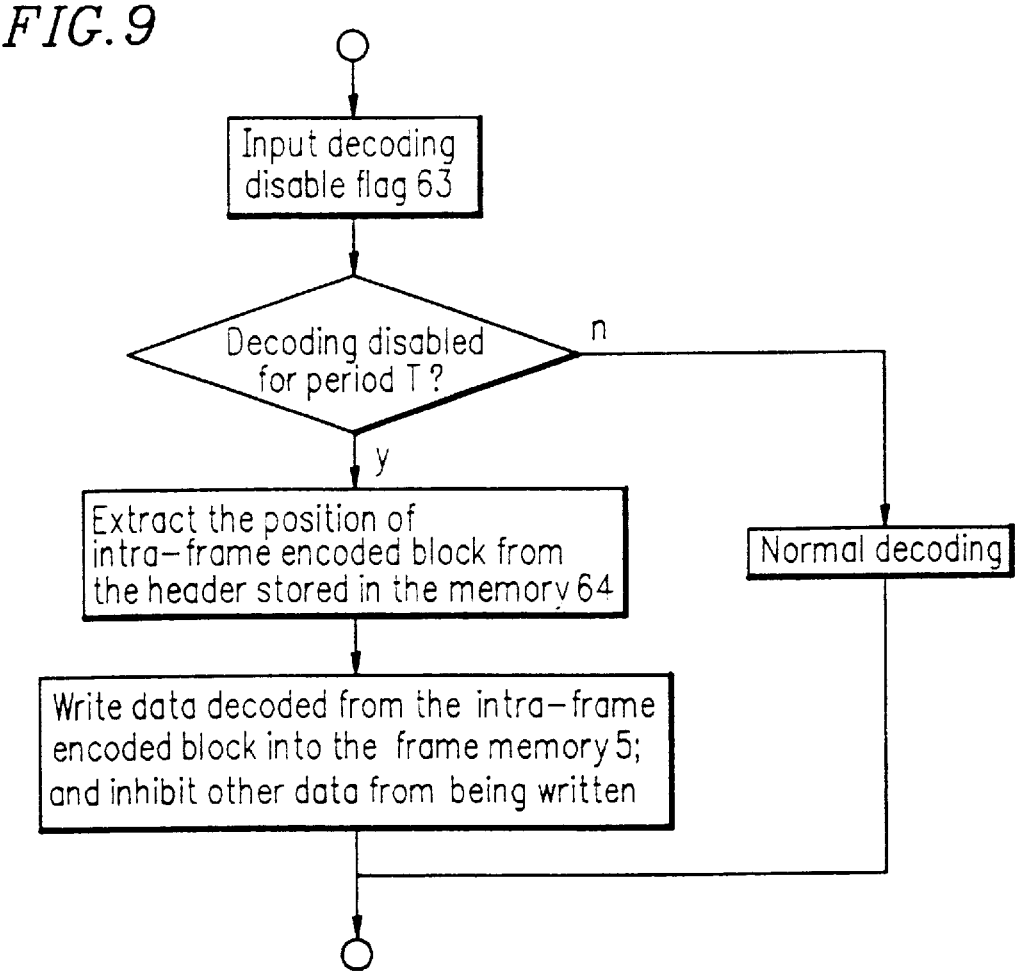
FIG. 9 shows an algorithm illustrating the operation of the CPU in the third example according to the invention.

FIG. 8 is a block diagram of the picture decoding apparatus in the third example according to the invention. In FIG. 8, a picture decoding section 4 and a frame memory 5 are identical with the picture decoding section 4 and the frame memory 5 in the conventional example. A trick-play control section 6 includes a central processing unit (CPU) 61 and a memory 64. FIG. 9 shows an algorithm illustrating the operation of the CPU 61.

Hereinafter, the picture coding apparatus with the above construction will be described with reference to FIGS. 8 and 9.

The picture decoding apparatus is usually constructed in such a manner that, when the decoding of input compressed image data is disabled, only a part of image which can be decoded is updated, and for the remaining part of the image which cannot be decoded, the image of the previous frame is retained. Accordingly, for the outputs shown in FIGS. 5 and 6 in the first example, only the intra-frame encoded blocks can be updated without modifying the conventional picture decoding apparatus. This example provides a picture decoding apparatus which can reproduce a trick-play mode signal without adding any function to the picture reproduction apparatus.

In FIG. 8, it is assumed that the compressed image data shown in FIGS. 2 and 3 is input into the picture decoding section 4. The CPU 61 monitors a decoding disable flag 63 provided in the variable length decoder 42. The memory 64 stores the information of the header portion which can be variable-length decoded. If decoding-disabled blocks are detected for a predetermined period, and it is determined that the decoding is disabled because a trick play is performed, the CPU 61 operates in accordance with the algorithm shown in FIG. 9. The positional information of intra-frame encoded block is extracted from the header information stored in the memory 64. Next, the CPU 61 outputs a frame memory input/output control signal 62, so as to extract the image data of intra-frame encoded blocks from the compressed image data. The extracted image data is decoded and then written into the frame memory 5. The other image data is not updated.

As described above, according to this example, if the input compressed data is the same as in the normal playback, a picture can be obtained in the trick play mode because the picture decoding apparatus itself determines if the trick play is performed.

EXAMPLE 4

Figure 10:
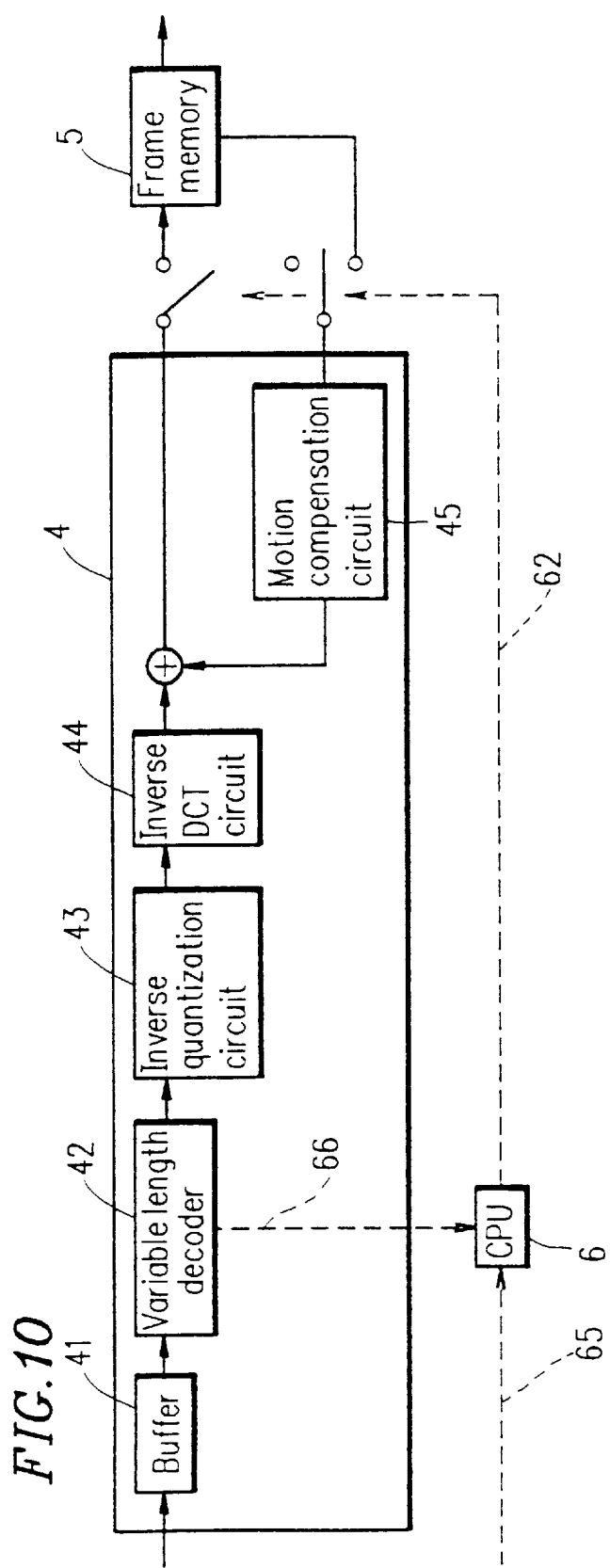
FIG. 10 is a block diagram of a picture decoding apparatus in a fourth example according to the invention.

FIG. 10 is a block diagram of a picture decoding apparatus in a fourth example according to the invention. In FIG. 10, a picture decoding section 4 and the frame memory 5 are identical with those in the third example. The fourth example is mainly different from the third example in that the trick-play control section 6 is constituted only by a CPU in the fourth example.

In FIG. 10, when the trick play is to be performed, a trick-play mode signal 65 in the second example is input into the trick-play control section 6. From the variable length decoder 42, a flag 66 indicating whether the input compressed image data is the intra-frame encoded data or not is input to the trick-play control section 6. The CPU of the trick-play control section 6 performs the control in such a manner that only the intra-frame encoded blocks are written into the frame memory 5, and the remaining blocks of image data are not updated during the trick play. In this example, when the trick-play mode signal is input, the above operation is performed. Accordingly, even if the picture decoding apparatus operates to change the retained image depending on the error occurrence condition as in the second example, the proper process can be performed during the trick play.

As described above, only the intra-frame encoded blocks reproduced by the picture reproduction apparatus are decoded and displayed, and the image data of the other blocks is not updated. Therefore, it is possible to obtain a trick-played image with the desired image quality.

In this example, the trick-play mode signal 65 is input. However, the invention is not limited thereto. Alternatively, if a decoding disable input which indicates that the decoding of inter-frame encoded blocks is disabled is input instead of the trick-play mode signal 65, the same effects as in this example can be attained. The trick-play mode signal 65 may be included in the compressed image data and then input to the picture decoding section 4 together with the compressed image data.

EXAMPLE 5

Figure 11:
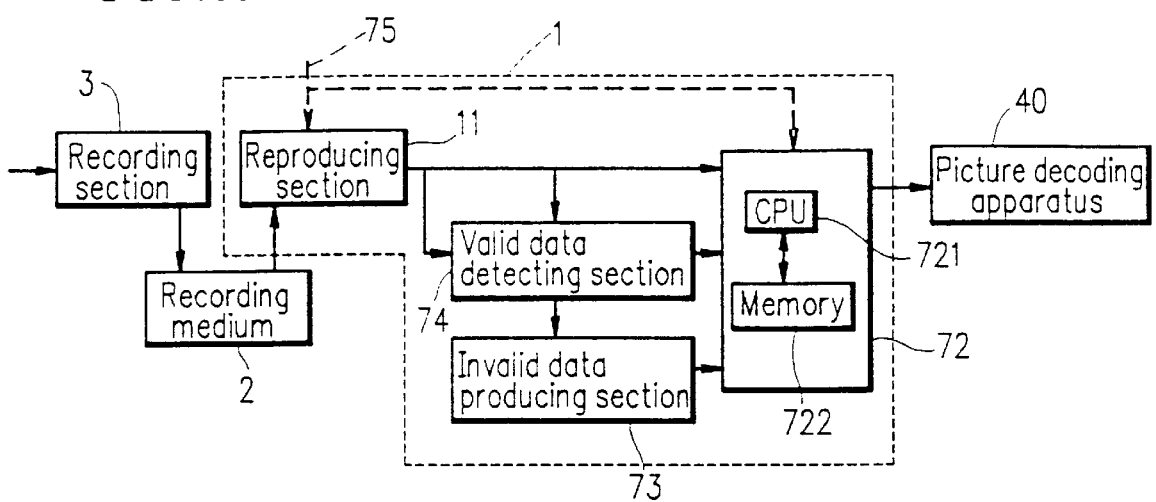
FIG. 11 is a block diagram of a picture reproduction apparatus in a fifth example according to the invention.
Figure 12:
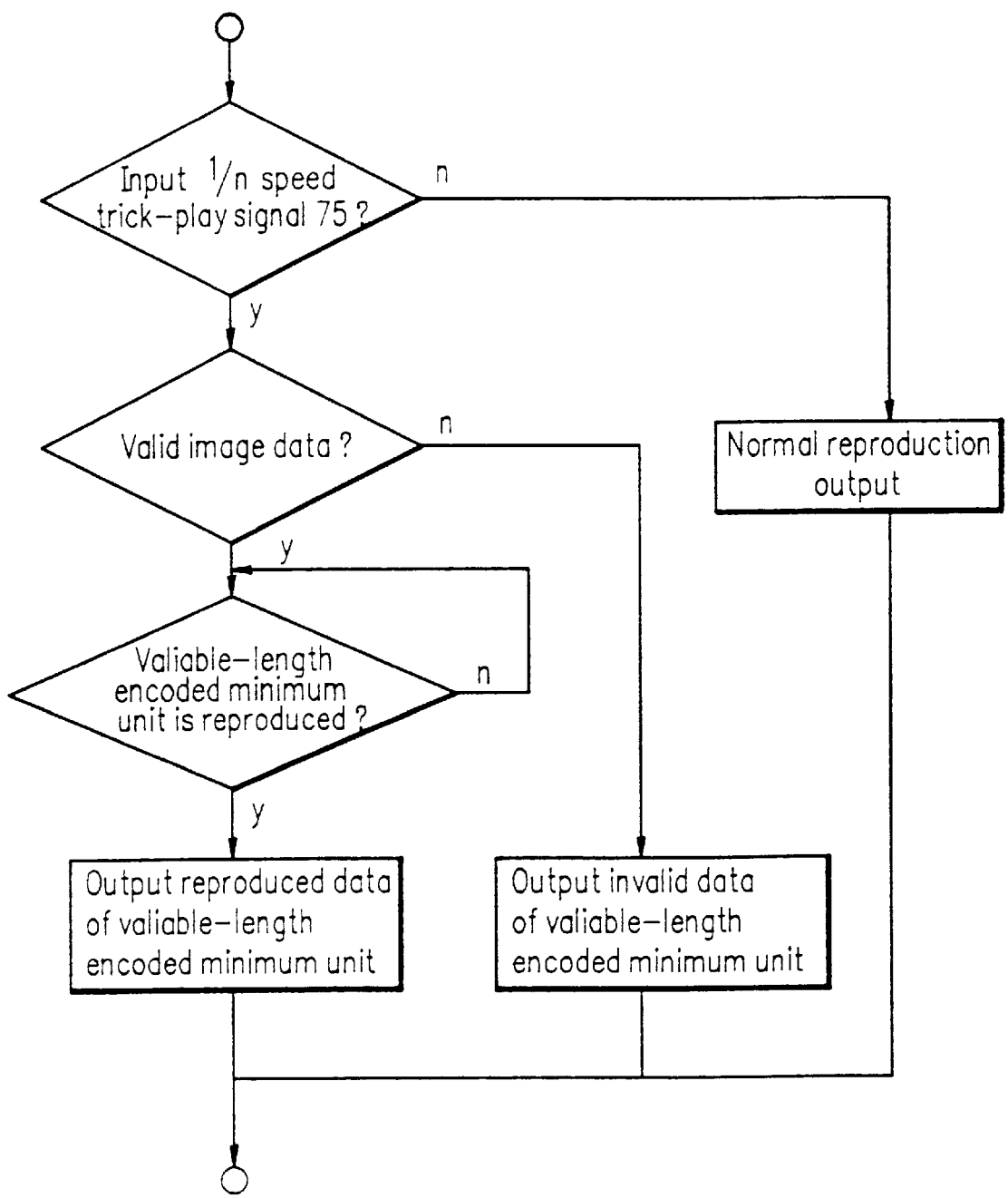
FIG. 12 shows an algorithm illustrating the operation of the CPU in the fifth example according to the invention.

FIG. 11 is a block diagram of a picture reproduction apparatus in a fifth example according to the invention. In FIG. 11, the picture reproduction apparatus 1 includes a reproducing section 11, a trick-play control section 72, an invalid data producing section 73, and a valid data detecting section 74. Also, a recording medium 2, a recording section 3, and a picture decoding apparatus 40 are shown in FIG. 11. FIG. 12 shows the algorithm illustrating the operation of a CPU 721 in the trick-play control section 72. FIGS. 13A through 13E illustrate the outputs of the picture reproduction apparatus 1.

The picture reproduction apparatus having the above construction will be described with reference to FIGS. 11, 12, 13A, 13B, 13C, 13D, and 13E.

In FIG. 11, the input image data is compressed by inter-frame encoding. In the recording section 3, the compressed image data is reformatted into a recording format, and an error correction code is added, similar to the recording section 92 in the conventional example. Then, the reformatted image data with the error correction code is recorded on the recording medium 2. During the normal playback, any error in the reproduced signal is corrected, and the reproduced signal is reformatted into a decoding format in the reproducing section 11. Thereafter, the reproduced image data is sent to the picture decoding apparatus 40.

When a signal 75 which requires a slow playback at a 1/N speed is input, the reproducing section reproduces the image data by taking a time period multiplied by N, as described in the conventional example. The reproduced image data is input into the trick-play control section 72 and the valid data detecting section 74. In the valid data detecting section 74, only the valid image data is extracted from the reproduced image data. The extraction is performed, for example, by utilizing the error detection result in the reproducing section 11. Alternatively, according to some recording methods, the end of the valid data or the amount of valid data is previously known by a header of the valid data. In such a case, the extraction is performed by utilizing the information known from the header.

The CPU 721 of the trick-play control section 72 first stores the reproduced image data into the memory 722. Next, the CPU 721 operates in accordance with the algorithm shown in FIG. 12. A valid data detection signal is input from the valid data detecting section 74, and only the valid image data is extracted from the reproduced image data stored in the memory. Next, the valid image data is split into variable-length encoding data units. The unit is the minimum unit capable of being variable-length encoded. The unit data is output at the same speed as in the normal playback. In general, the synchronization pattern is added to each variable-length encoding unit, so that the valid image data can easily be split into variable-length encoding units by detecting the synchronization pattern. In the remaining time period other than the period in which the variable-length encoding unit data is output, the invalid data produced in the invalid data producing section 73 is output into the picture decoding apparatus 40. In this case, as the invalid data, a pattern which does not cause the picture decoding apparatus to malfunction, such as data, that is, all 0 is selected.

Figure 13A:
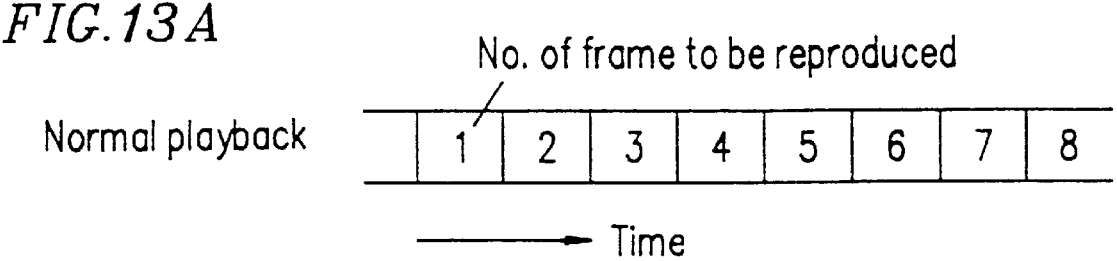
FIGS. 13A through 13E illustrate outputs from the picture reproduction apparatus in the fifth example according to the invention.
Figure 13B:
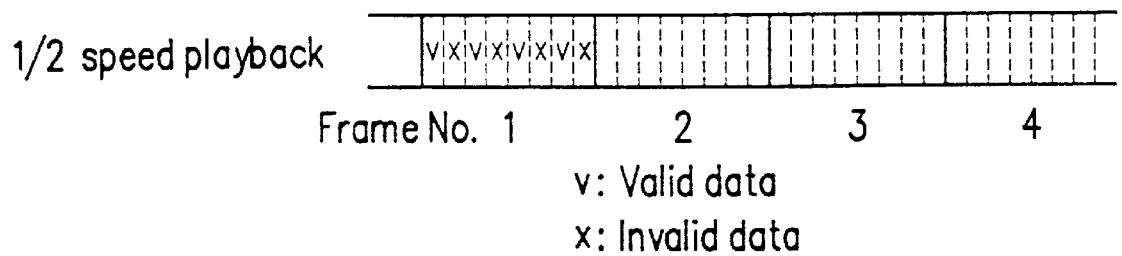

FIG. 13A shows the exemplary output during the normal speed playback. FIG. 13B shows the exemplary output during the ½ speed playback. The reproduced image data and the invalid data are alternately output into the reproduction apparatus by variable-length encoding unit. In general, when the decoding is disabled, the picture decoding apparatus 40 retains the previous screen. Accordingly, when the above output is received, the valid image data of one frame is input for a period of two frames, and the same screen is retained for the two-frame period. Thus, the slow playback at the ½ speed is realized.

In FIG. 13B, the valid data and the invalid data are alternately output by variable-length encoding unit. However, the output is not necessarily performed alternately. Alternatively, after the valid data consisting of several variable-length encoding units is output, the invalid data of the same number of units is output. In such a case, the same effects as in the above example can be attained.

Figure 13C:
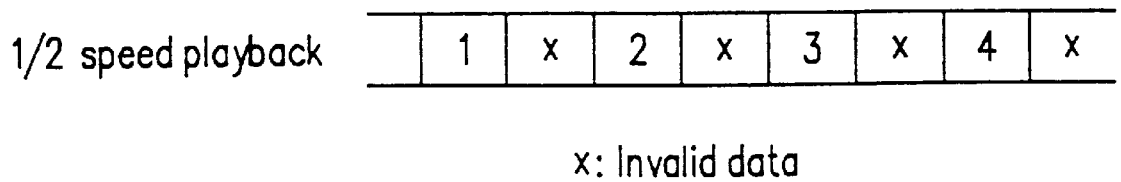
Figure 13D:
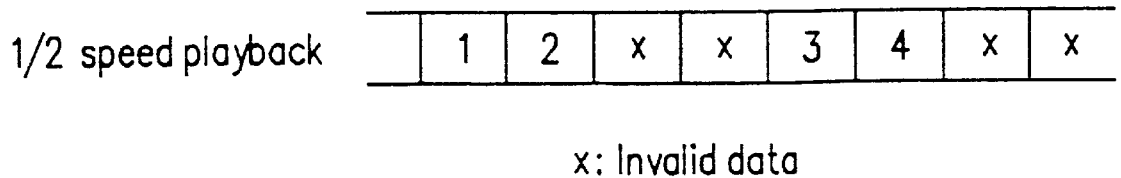

FIG. 13C shows another exemplary output during the ½ speed playback. By changing the program for the CPU 121 in the construction shown in FIG. 11, the outputs shown in FIGS. 13C, 13D, and 13E can be realized. In the case shown in FIG. 13C, when the ½ slow playback mode signal is input, the extracted valid image data of one frame and the invalid data of one frame are output into the picture decoding apparatus. In this way, the valid data of one frame is reproduced for a unit period of two frames, and hence the slow playback at the ½ speed is realized. When a ⅓ speed playback is to be performed, the valid image data of one frame and the invalid data of two frames are output into the picture decoding apparatus. FIG. 13D shows another exemplary output during the ½ speed playback. In this case, the valid image data of two frames and the invalid data of two frames are alternately output. Also in this way, the slow playback at the ½ speed is realized. In addition, a special effect in that the picture vibrates by every two frames can be attained.

Figure 13E:
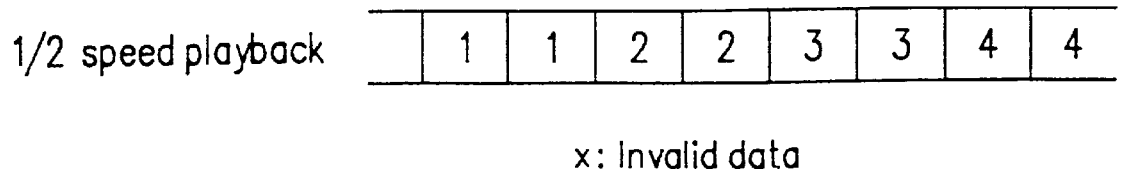

FIG. 13E shows another exemplary output during the ½ speed playback similar to 13C and 13D. In the case shown in FIG. 13E, when the slow playback mode signal is input, the reproduced image data is split into M frames. Each of the M split frames is repeated N times, and output into the picture decoding apparatus. For example, M=1, and the data of one frame is repeated twice and output, so the picture decoding apparatus 40 decodes the frame number in the normal compressed image data, so as to write the decoded image into a frame memory for image reproduction. Accordingly, when the reproduced image data having the same frame number is input, the data is written into the same frame memory. That is, the two frames which are identical with each other are reproduced for the two-frame period, so that the slow playback at the ½ speed is realized.

EXAMPLE 6

Figure 14:
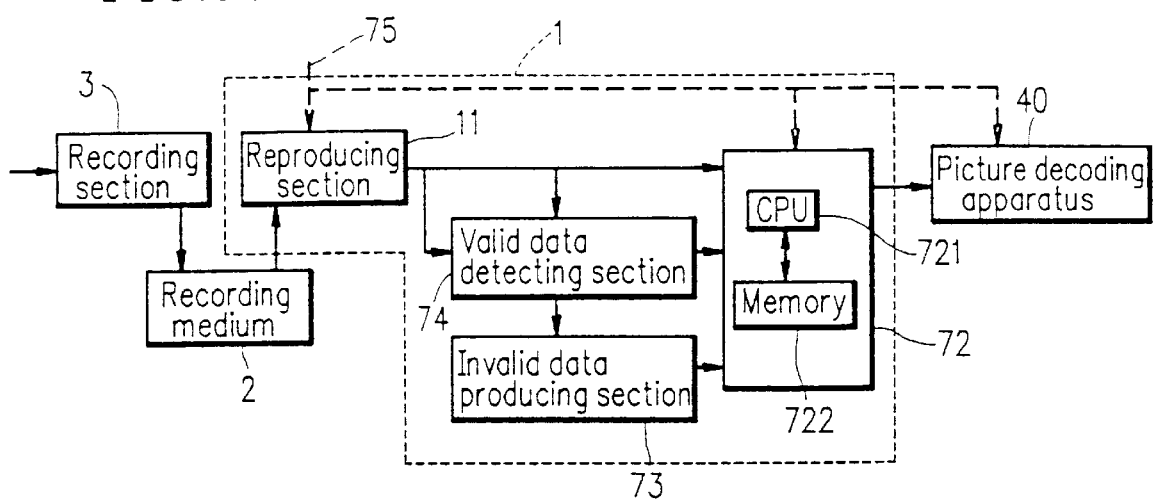
FIG. 14 is a block diagram of a picture reproduction apparatus in a sixth example according to the invention.

FIG. 14 is a block diagram of a picture reproduction apparatus in a sixth example according to the invention. The sixth example is mainly different from the fifth example in that the slow playback signal 75 is fed into the picture decoding apparatus 40 together with the image signal in the sixth example. In the fifth example, when the invalid data is input during the slow playback, the picture decoding apparatus retains the previous image screen. However, some decoding apparatus may switch the operation thereof between the process in which the image data of previous frame is retained for the inter-frame encoded frame, and the process in which the image data of intra-frame encoded frame previously sent is substituted for the inter-frame encoded frame, depending on the error occurrence condition. Accordingly, by sending the slow playback mode signal together with the trick-play compressed image data, the processing during the slow playback can be surely performed.

The above examples are described by way of an apparatus for recording/reproducing image data compressed by both intra-frame encoding and inter-frame encoding. However, the invention is not limited to the specific type of apparatus. Alternatively, such an apparatus can be easily combined with a recording/reproducing apparatus using intra-frame encoding only.

In the above examples, only the playback at the ½ speed or ⅓ speed is described. Alternatively, the invention can be applied to any playback at a 1/N speed.

In the sixth example, the slow playback mode signal is fed in addition to the trick-play compressed image data. However, the invention is not limited to this specific case. Alternatively, the slow playback mode signal may be fed as part of the trick-play compressed image data. For example, the slow payback mode signal may be included in the header of the trick-play compressed image data.

EXAMPLE 7

Hereinafter, a picture decoding apparatus in a seventh example according to the invention will be described with reference to FIGS. 15 and 16.

Figure 15:
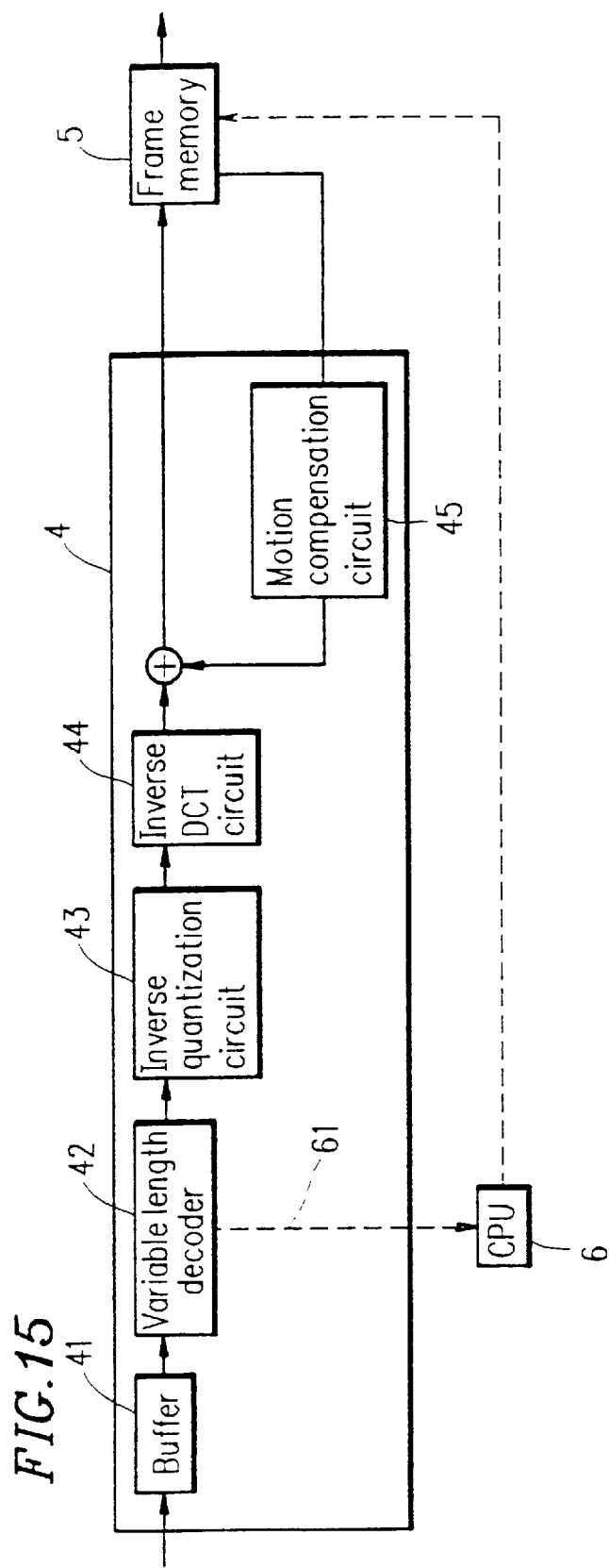
FIG. 15 is a block diagram of a picture decoding apparatus in a seventh example according to the invention.
Figure 16:
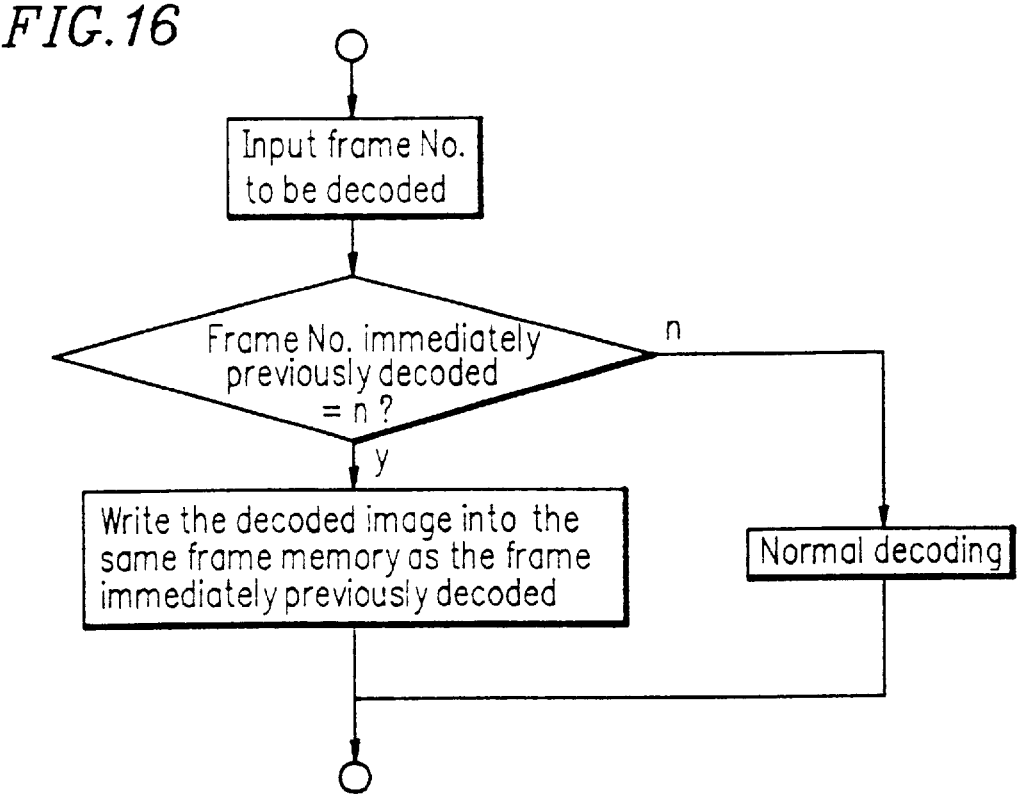
FIG. 16 shows an algorithm illustrating the operation of the CPU in the seventh example according to the invention.

FIG. 15 is a block diagram of the picture decoding apparatus in the seventh example according to the invention. A picture decoding section 4 and a frame memory 5 in FIG. 15 are identical with those in the conventional example. A trick-play control section 6 is constituted by a CPU. FIG. 16 shows the algorithm illustrating the operation of the CPU.

The picture coding apparatus having the above construction will be described below with reference to FIGS. 15 and 16.

In FIG. 15, a flag 61 indicating the decoded frame number is input from the variable length decoder 42. The CPU of the trick-play control section 6 operates in accordance with the algorithm shown in FIG. 16. The CPU 6 stores the numbers of frames which have been already decoded. When the same frame is repeatedly decoded, the currently decoded frame is written into the frame memory in which the previously decoded frame with the same number has been stored. If the encoded images with the same frame number are repeated N times, the writing into the same frame memory is performed N times. In this apparatus, as long as the same frame memory is updated, a displayed image data is output from the same frame memory. As a result, the playback at the 1/N speed is realized.

The algorithm for the CPU 6 may be changed so that, if the currently decoded frame is the same as the previously decoded frame, the frame memory is not updated. In such a case, the same operation can also be realized.

Moreover, if it is judged that the decoding operation which is usually finished in one frame takes a time equal to N frames, by the flag 61 from the variable length decoder 42, the CPU 6 determines that the 1/N speed playback is now performed. Next, if the CPU 6 performs a control so as to hold the input/output of the frame memory 5 for a period equal to N frames and then to reproduce it, the same effects can be attained.

EXAMPLE 8

Figure 17:
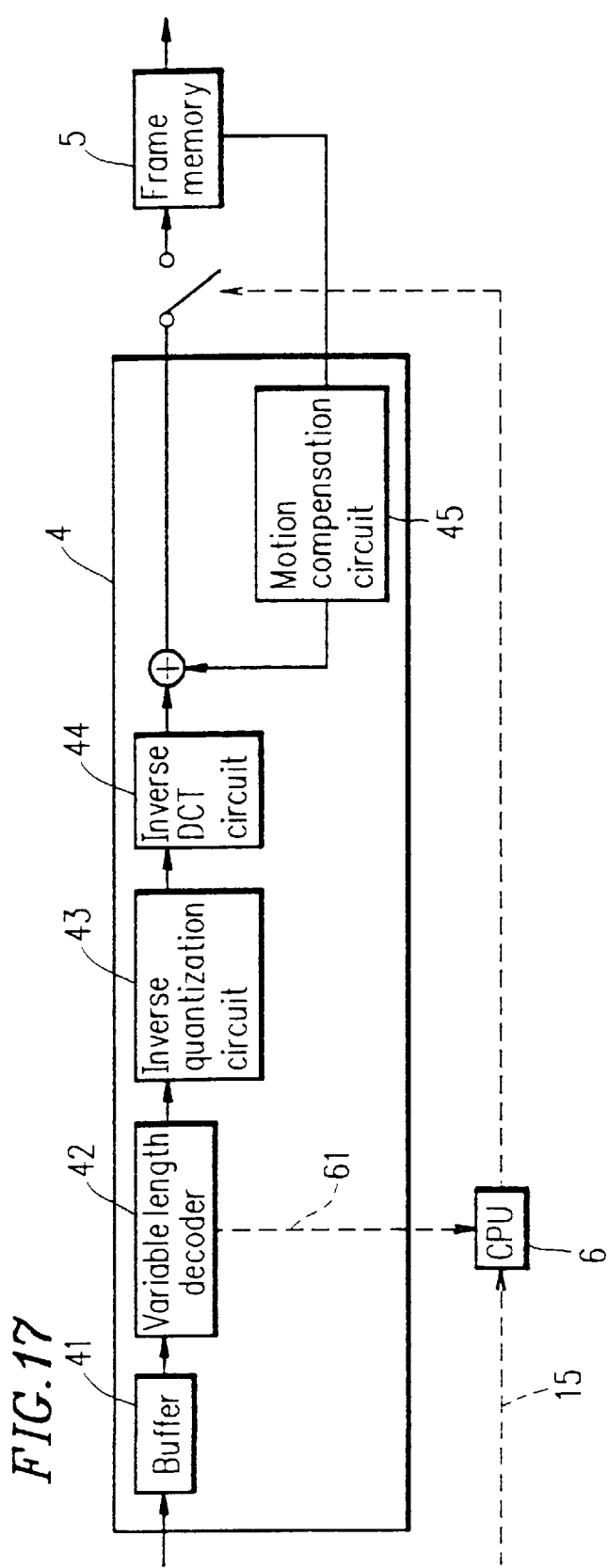
FIG. 17 is a block diagram of a picture decoding apparatus in an eighth example according to the invention.

FIG. 17 is a block diagram of a picture decoding apparatus in an eighth example according to the invention. In FIG. 17, a picture decoding section 4 and a frame memory 5 are identical with those in the seventh example. The eighth example is mainly different from the seventh example in that a slow playback mode signal 75 is input into the CPU of the trick-play control section 6. In the seventh example, the CPU judges that the slow playback is being performed by using the information from the variable length decoder 42.

If the slow playback mode signal is input as in the eighth example, it is unnecessary for the variable length decoder to send the frame number to the trick-play control section 6. Furthermore, the same operation can be performed. The trick-play mode signal 65 may be included in the compressed image data and then input to the picture decoding section 4 together with the compressed image data.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A picture reproduction apparatus for reproducing compressed image data from a recording medium, and for outputting the image data reproduced from the recording medium into a picture decoding apparatus, in accordance with either one of a normal playback mode or a slow playback mode, the picture reproduction apparatus comprising:

reproducing means for reproducing the compressed image data from the recording medium, and for outputting the reproduced image data including valid image data and invalid image data;

valid image data detecting means for detecting the valid image data from the reproduced image data capable of being recovered of the image data or invalid image data having no relationship with the image data, and for generating a valid data detection signal identifying the valid image data;

invalid data producing means for producing invalid data; and trick-play control means for, in the normal playback mode, outputting the image data obtained from the reproducing means, and for, in the slow playback mode and when the valid data detection signal is input from the valid data detecting means, dividing the valid image data into variable-length encoded unit data, the unit being the minimum unit capable of being variable-length encoded, so as to alternately output the variable-length encoded unit data of one unit or more and the invalid data.

2. A picture reproduction apparatus according to claim 1, further comprising recording means for receiving the compressed image data and for recording it onto the recording medium.

3. A picture reproduction apparatus according to claim 1, wherein the trick-play control means outputs the valid image data and the invalid data, and also outputs a trick-play mode signal into the picture decoding apparatus in the trick-play mode.

4. A picture reproduction apparatus for reproducing compressed image data from a recording medium, and for outputting the image data reproduced from the recording medium into a picture decoding apparatus, in accordance with either one of a normal playback mode or a slow playback mode, the picture reproduction apparatus comprising:

reproducing means for reproducing the compressed image data from the recording medium, and for outputting the reproduced image data including valid image data and invalid image data;

valid image data detecting means for detecting the valid image data from the reproduced image data capable of being recovered of the image data or invalid image data having no relationship with the image data, and for generating a valid data detection signal identifying the valid image data;

invalid data producing means for producing invalid data; and trick-play control means for, in the normal playback mode, outputting the image data obtained from the reproducing means, and for, in the slow playback mode at a 1/N speed (N is a natural number) outputting one frame of the valid image data and (N−1) frames of the invalid data in a period equivalent to N frames in the normal playback.

5. A picture reproduction apparatus according to claim 4, further comprising recording means for receiving the compressed image data and for recording it onto the recording medium.

6. A picture reproduction apparatus according to claim 4, wherein the trick-play control means outputs the valid image data and the invalid data, and also outputs a trick-play mode signal into the picture decoding apparatus in the trick-play mode.

7. A picture reproduction apparatus for reproducing compressed image data from a recording medium, and for outputting the image data reproduced from the recording medium into a picture decoding apparatus, in accordance with either one of a normal playback mode or a slow playback mode, the picture reproduction apparatus comprising:

reproducing means for reproducing the compressed image data from the recording medium, and for outputting the reproduced image data including valid image data and invalid image data;

valid image data detecting means for detecting the valid image data from the reproduced image data capable of being recovered of the image data or invalid image data having no relationship with the image data, and for generating a valid data detection signal identifying the valid image data;

invalid data producing means for producing invalid data; and trick-play control means for, in the normal playback mode, outputting the image data obtained from the reproducing means, and for, in the slow playback mode at a 1/N speed (N is a natural number) storing M (M is a natural number) frames of the valid image data obtained by the valid image data detecting means, so as to periodically output M frames of the valid image data and (N−1)×M frames of the invalid data.

8. A picture reproduction apparatus according to claim 7, further comprising recording means for receiving the compressed image data and for recording it onto the recording medium.

9. A picture reproduction apparatus according to claim 7, wherein the trick-play control means outputs the valid image data and the invalid data, and also outputs a trick-play mode signal including a slow playback ratio N, into the picture decoding apparatus in the trick-play mode.

10. A picture reproduction apparatus for reproducing compressed image data from a recording medium, and for outputting the image data reproduced from the recording medium into a picture decoding apparatus, in accordance with either one of a normal playback mode or a slow playback mode, the picture reproduction apparatus comprising:

reproducing means for reproducing the compressed image data from the recording medium, and for outputting the reproduced image data including valid image data and invalid image data;

valid image data detecting means for detecting the valid image data from the reproduced image data capable of being recovered of the image data or invalid image data having no relationship with the image data, and for generating a valid data detection signal identifying the valid image data;

invalid data producing means for producing invalid data; and trick-play control means for, in the normal playback mode, outputting the image data obtained from the reproducing means, and for, in the slow playback mode at a 1/N speed (N is a natural number) storing the valid image data obtained by the valid data detecting means, and dividing the stored valid image data into M frames, so as to repeatedly output each of the M frames N times.

11. A picture reproduction apparatus according to claim 10, further comprising recording means for receiving the compressed image data and for recording it onto the recording medium.

12. A picture reproduction apparatus according to claim 10, wherein the trick-play control means outputs the valid image data and the invalid data, and also outputs a trick-play mode signal including a slow playback ratio N, into the picture decoding apparatus in the trick-play mode.

* * * * *